Oct. 9, 1923.
H. WINTLE
SHEARS OR SCISSORS
Filed March 6, 1922
1,470,417
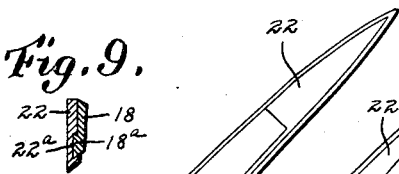
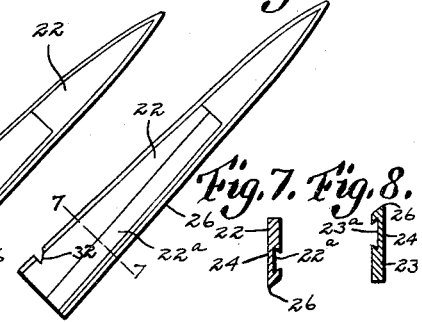
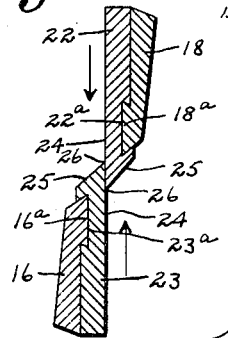
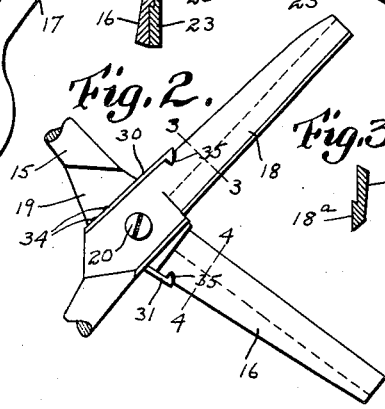
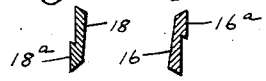
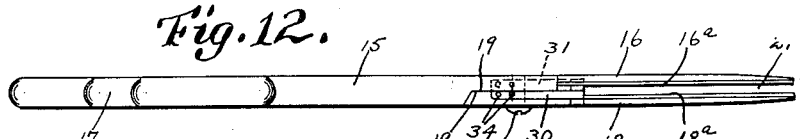
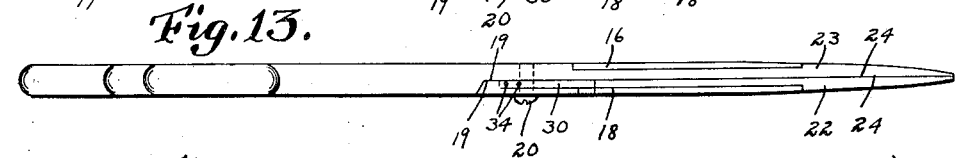
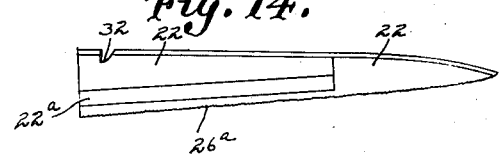
Inventor:
Henry Wintle
by Hught Brown Quinby May
attys.

Patented Oct. 9, 1923.

1,470,417

UNITED STATES PATENT OFFICE.

HENRY WINTLE, OF JACKMAN, MAINE.

SHEARS OR SCISSORS.

Application filed March 6, 1922. Serial No. 541,449.

*To all whom it may concern:*

Be it known that I, HENRY WINTLE, a citizen of the Dominion of Canada, residing at Jackman, in the county of Somerset and State of Maine, have invented new and useful Improvements in Shears or Scissors, of which the following is a specification.

This invention relates to shears and scissors which include blade portions and pivotally connected handle portions, separably connected with the blade portions so that a plurality of sharpened blade portions may be kept on hand for use with one pair of handle portions and substituted for dulled blades.

The object of the invention is to so improve the form and construction of implements of this character, as to enable the blade portions to present continuous front sides facing and contacting with each other, as in ordinary shears, and to provide improved means for releasably securing the blade portions to the handle portions.

The invention is embodied in the improvements which I will now proceed to describe and claim.

Of the accompanying drawings, forming a part of this specification,—

Figure 1 is a side view of a pair of shears embodying the invention, in condition for use.

Figure 2 is a view similar to a portion of Figure 1, the blades being removed.

Figure 3 is a section on line 3—3 of Figure 2.

Figure 4 is a section on line 4—4 of Figure 2.

Figures 5 and 6 are side views of the two blades.

Figure 7 is a section on line 7—7 of Figure 5.

Figure 8 is a section on line 8—8 of Figure 6.

Figure 9 is a section on line 9—9 of Figure 1.

Figure 10 is a section on line 10—10 of Figure 1.

Figure 11 is an enlarged sectional view, showing both blades and the blade engaging arms hereinafter described, the blades being in contact with each other.

Figure 12 is an edge view, the blades being removed.

Figure 13 is an edge view, the blades being applied.

Figure 14 is a view similar to Figure 5, showing a different form of cutting edge.

The same reference characters indicate the same parts in all of the figures.

The body portion of my improved implement is composed of two elongated members, one of which includes an inner handle arm 15, and an outer blade-engaging arm 16. The other member includes an inner handle arm 17, and an outer blade-engaging arm 18. Said members are provided between the arms with reciprocal bearing faces 19, contacting with each other.

A pivot stud 20 passing through the faces 19 pivotally connects the members as in ordinary shears. The outer arms 16 and 18 have longitudinal dovetailed ribs $16^a$ and $18^a$ on their inner sides, and are offset from the bearing faces 19, so that their inner sides and ribs are separated by a space 21, as shown by Figure 12, adapted to receive portions of the shear blades 22 and 23. Said blades have continuous front sides 24, intersecting the beveled inner edge faces 25 of the blades to form cutting edges 26. In the back sides of the blades are dovetailed longitudinal grooves $22^a$ and $23^a$, formed to slide upon and engage the ribs $16^a$ and $18^a$. The blades are therefore movable endwise, into and out of engagement with the outer arms, portions of their continuous front sides 24 meeting in the space 21, as shown by Figure 13. The inward movement of the blades is limited by the outer ends of the ribs, these ends forming stops against which the closed ends of the blade grooves abut.

The form of the blades and body members is such that the cutting edges 26 of the blades have the usual progressive impingement against each other when they are cutting, the cutting action being the same as in ordinary shears. The spacing apart of the blade-engaging arms 16 and 18 enables the ribs and grooves to be spaced from each other, so that the front sides 24 of the blades are continuous, as in ordinary shears. In other words, said faces are not interrupted between the cutting edges 26 and the outer edge faces of the blades.

The blade-engaging arms 16 and 18 are wider than the ribs $16^a$ and $18^a$ formed on their inner sides, and are formed to bear on and laterally support portions of the outer sides of the blades 22 and 23, as shown by Figure 11, so that the blades are more firmly confined against crosswise tipping movements than would be the case if the width of the arms were limited to the width of the ribs. The outer edges of the arms are substantially flush with the outer edges of the blades, so that the hooked catches hereinafter described, on the outer edges of the arms, are adapted to engage notches in the outer edges of the blades.

To releasably secure the blades to the body members against accidental outward movement thereon, I provide hooked spring catches 30 and 31, and notches 32 and 33, formed to receive the acting portions of said catches. The catch 30 is fixed as by rivets 34, to the outer edge face of the body member which carries the arm 18, and is adapted to spring into the notch 32, which is formed in the outer edge face of the blade 22. The catch 31 is similarly fixed to the outer edge face of the body member which carries the arm 16, and is adapted to spring into the notch 33, which is formed in the outer edge face of the blade 23. The arms 16 and 18 are preferably cut away at 35 (Figure 2) to accommodate the catches. The hooks of the catches project inwardly from said arms, and overhang the space between the arms, as shown by Figure 12. The hook of each catch has a beveled face, and one side of each notch is at a right angle with the length of the blade, and faces the front of the blade, so that the catches automatically engage the notches when the blades are moved inwardly to place, and may be readily displaced to permit the removal of the blades.

A cutting implement constructed as described, may be adapted for use as shears having relatively long blades, or as scissors having shorter blades.

One of the blades, for example, the blade 22, may have a finely serrated cutting edge 26ᵃ (Figure 14), adapted to cooperate with a blade having a smooth cutting edge to confine hair from slipping on the blade in certain hair-cutting or trimming operations, the detachability of the blades enabling a serrated and a smooth-edged blade to be used interchangeably.

I claim:

1. Shears comprising a pair of separately formed blades having longitudinal dovetail grooves in their outer sides; and a pair of body members connected by a pivot, and having handles extending rearward from the pivot, and blade-engaging arms projecting forward from the pivot, and spaced apart to receive the blades between their inner sides, the blade-engaging arms being provided with longitudinal dovetail ribs on their inner sides, which enter the blade grooves, and are narrower than the arms, so that portions of the arms bear on, and laterally support, portions of the outer sides of the blades.

2. Shears comprising a pair of separately formed blades having longitudinal dovetail grooves in their outer sides; and a pair of body members connected by a pivot, and having handles extending rearward from the pivot, and blade-engaging arms projecting forward from the pivot, and spaced apart to receive the blades between their inner sides, the blade-engaging arms being provided with longitudinal dovetail ribs on their inner sides, extending from adjacent the pivot to the forward ends of the arms and substantially throughout the length of the blade grooves, the outer edges of the blade-engaging arms being substantially flush with the outer edges of the blades and provided with hooked spring catches, adapted to spring into engagement with notches in said blades when the blades are moved to place on the arms.

3. Shears comprising a pair of separately formed blades having longitudinal dovetail grooves in their outer sides, a pair of pivotally connected body members, having handles extending rearward from the pivot and blade-engaging arms projecting forward from the pivot, the inner sides of said arms being provided with longitudinal dovetail ribs, adapted to enter the grooves in the blades and support the latter on said arms, and means independent of the pivotal connection between the body members for preventing relative longitudinal movement between the blades and arms.

In testimony whereof I have affixed my signature.

HENRY WINTLE.